United States Patent [19]

Suga et al.

[11] Patent Number: 5,129,370

[45] Date of Patent: Jul. 14, 1992

[54] VALVE TIMING CONTROL DEVICE FOR AUTOMOTIVE INTERNAL COMBUSTION ENGINE CLUTCH MECHANISM

[75] Inventors: Seiji Suga; Shoji Morita, both of Kanagawa, Japan

[73] Assignee: Atsugi Unisia Corporation, Kanagawa, Japan

[21] Appl. No.: 632,026

[22] Filed: Dec. 21, 1990

[30] Foreign Application Priority Data

| Dec. 25, 1989 | [JP] | Japan | 1-335670 |
| Feb. 28, 1990 | [JP] | Japan | 2-47743 |
| Feb. 28, 1990 | [JP] | Japan | 2-47745 |
| May 31, 1990 | [JP] | Japan | 2-142494 |

[51] Int. Cl.$^5$ ............................................. F01L 1/34
[52] U.S. Cl. ............................. 123/90.17; 123/90.31; 464/2
[58] Field of Search ............... 123/90.15, 90.17, 90.31; 464/1, 2

[56] References Cited

U.S. PATENT DOCUMENTS

| 4,494,496 | 1/1985 | Nakamura et al. | 123/90.17 |
| 4,627,825 | 12/1986 | Bruss et al. | 123/90.17 |
| 4,708,101 | 11/1987 | Hara et al. | 123/90.16 |
| 4,754,727 | 7/1988 | Hampton | 123/90.17 |
| 4,841,924 | 6/1989 | Hampton et al. | 123/90.17 |
| 4,856,465 | 8/1989 | Denz et al. | 123/90.17 |
| 5,002,023 | 3/1991 | Butterfield et al. | 123/90.17 |
| 5,012,773 | 5/1991 | Akasaka et al. | 123/90.31 |
| 5,056,478 | 10/1991 | Ma | 123/90.17 |
| 5,056,479 | 10/1991 | Suga | 123/90.17 |

FOREIGN PATENT DOCUMENTS 0424103 4/1991 European Pat. Off. .
8910469 11/1989 World Int. Prop. O. .
9008248 7/1990 World Int. Prop. O. .

Primary Examiner—E. Rollins Cross
Assistant Examiner—Weilun Lo
Attorney, Agent, or Firm—Bachman & LaPointe

[57] ABSTRACT

A valve timing control device for an internal combustion engine, comprises an engine synchronous rotary member, such as a timing sprocket, timing pulley and so forth, driven by an engine output in synchronism with engine revolution, and a camshaft. The device also has first means disposed between said engine synchronous rotary member and said camshaft for causing relative angular displacement between said engine synchronous rotary member and said camshaft synchronous rotary member in a first dislacement direction for retarding valve timing and interlocking said camshaft and said engine synchronous rotary member for preventing relative angular displacement in a second displacement direction which is opposite from said first direction, for advancing valve timinmg, and second means disposed between said engine synchrous rotary member and said camshaft for causing relative angular displacement between said engine synchronous rotary member and said camshaft synchronous rotary member in said displacement direction for advancing valve timing and interlocking said camshaft and said engine synchronous rotary member for preventing relative angular displacement in said first displacement direction for retarding valve timing. Third means is provided for selectively activating one of said first and second means in response to the engine driving condition for retarding and advancing phase relationship between said engine synchronous member and said camshaft.

6 Claims, 15 Drawing Sheets

VALVE TIMING CONTROL DEVICE FOR AUTOMOTIVE INTERNAL COMBUSTION ENGINE CLUTCH MECHANISM

BACKGROUND OF THE INVENTION

1. Field of the Invention

The present invention relates generally to a valve timing control device for an internal combustion chamber for adjusting phase relationship between an engine revolution synchronous component, such as a timing sprocket or pulley connected to an engine output shaft via a timing chain or timing belt, and a cam drive component, such as a camshaft, and whereby adjusting opening timing of an intake valve and/or an exhaust valve. More specifically, the invention relates to a valve timing control device which has simplified construction with reduction of frictional element to resolve problems of wearing or secular variation with maintaining satisfactory valve timing adjusting performance.

2. Description of the Background Art

In the modern automotive technologies, it is important to achieve both high driving performance and fuel economy. High engine performance is especially important at high engine load range. On the other hand, at low engine load range, fuel economy will be regarded as more important factor than the engine performance. Furthermore, in recent days, anti-polution is becoming a more important factor for avoiding contamination of atmosphere. Fuel consumption and purity of exhaust gas can be adjusted by adjusting induction efficiency of an air/fuel mixture into engine combustion chambers. For adjusting mixture gas induction efficiency, some of advanced automotive internal combustion engines employ variable cam timing technologies for advancing and retarding valve open timing with respect to top-dead-center (TDC) in the engine revolution cycle.

For example, the U.S. Pat. No. 4,535,731, issued on Aug. 20, 1985, proposes a valve timing control device for an internal combustion engine. The device adjusts open timing of an intake valve and/or exhaust valve of an internal combustion engine. The device includes a helical intermediate gear formed with an external helical gear teeth meshing with an internal gear teeth of an engine revolution synchronous component, such as a timing sprocket or timing pulley, and an internal gear teeth meshing with an external gear teeth of an internal gear which is rigidly connected to a camshaft. The intermediate gear is axially movable for varying rotational phase relationship between the engine revolution synchronous component and the internal gear. The axial position of the intermediate gear is adjusted hydraulically depending upon an engine driving condition so that open timing of the intake valve and/or the exhaust valve is advanced or retarded with respect to engine revolution cycle.

Such prior proposed valve timing control device is successfully in effectively adjusting valve timing. However, on the other hand, such prior proposed valve timing control device employs the helical gear teeth for adjusting the phase relationship between the rotational input torque and rotational cam drive torque. For holding accuracy in engagement between gears, substantially high accuracy in production is required. Therefore, machining of the gears becomes difficult and costly. Furthermore, during long use, wearing and secular variation may loser tight engagement between the gears and cause variation of the valve timing out of an optimal range.

Furthermore, since the prior proposed device is required to drive the helical intermediate gear meshing with the timing sprocket or timing pulley, and the inner gear, relatively great hydraulic and/or mechanical force is required and thus can cause lag time. For reliably accepting relatively large operational force, the whole assembly of the valve timing control device necessarily becomes bulky to increase engine weight.

SUMMARY OF THE INVENTION

In view of the drawbacks in the prior art, it is an object of the present invention to provide a valve timing control device which can solve the problems in the prior art.

Another and more specific object of the present invention is to provide a valve timing control device which can be constructed in compact and can provide higher response in adjustment of the valve timing.

According to one aspect of the invention, a valve timing control device for an internal combustion engine, comprises:

an engine synchronous rotary member driven by an engine output in synchronism with engine revolution;

a camshaft;

first means disposed between the engine synchronous rotary member and the camshaft for causing relative angular displacement between the engine synchronous rotary member and the camshaft synchronous rotary member in a first displacement direction for retarding valve timing and interlocking the camshaft and the engine synchronous rotary member for preventing relative angular displacement in a second displacement direction which is opposite from the first direction, for advancing valve timing;

second means disposed between the engine synchronous rotary member and the camshaft for causing relative angular displacement between the engine synchronous rotary member and the camshaft synchronous rotary member in the displacement direction for advancing valve timing and interlocking the camshaft and the engine synchronous rotary member for preventing relative angular displacement in the first displacement direction for retarding valve timing; and third means for selectively activating one of the first and second means in response to the engine driving condition for retarding and advancing phase relationship between the engine synchronous member and the camshaft.

According to another aspect of the invention, a valve timing control device for an internal combustion engine, comprises:

an engine synchronous rotary member driven by an engine output in synchronism with engine revolution;

a camshaft;

first means disposed between the engine synchronous rotary member and the camshaft and active while an engine load is lower than a predetermined engine load criterion, for causing relative angular displacement between the engine synchronous rotary member and the camshaft synchronous rotary member in a first displacement direction for retarding valve timing and interlocking the camshaft and the engine synchronous rotary member for preventing relative angular displacement in a second displacement direction which is opposite from the first direction, for advancing valve timing; and second means disposed between the engine synchronous rotary member and the camshaft and active while the engine load is higher than or equal to the predetermined engine load criterion, for causing relative angular displacement between the engine synchronous rotary member and the camshaft synchronous rotary member in the displacement direction for advancing valve timing and interlocking the camshaft and the engine synchronous rotary member for preventing relative angular displacement in the first displacement direction for retarding valve timing.

According to a further aspect of the invention, a valve timing control device for an internal combustion engine, comprises:

an engine synchronous rotary member driven by an engine output in synchronism with engine revolution;

a camshaft;

first means disposed between the engine synchronous rotary member and the camshaft for permitting relative angular displacement between the engine synchronous rotary member and the camshaft synchronous rotary member in a first displacement direction for retarding valve timing in response to a rotational torque in a first torque direction transmitted from the camshaft and interlocking the camshaft and the engine synchronous rotary member for preventing relative angular displacement in a second displacement direction which is opposite from the first direction, for advancing valve timing in response to the rotational torque in a second torque direction opposite to the first torque direction transmitted from the camshaft;

second means disposed between the engine synchronous rotary member and the camshaft for permitting relative angular displacement between the engine synchronous rotary member and the camshaft synchronous rotary member in the displacement direction for advancing valve timing in response to a rotational torque in a second torque direction transmitted from the camshaft and interlocking the camshaft and the engine synchronous rotary member for preventing relative angular displacement in the first displacement direction for retarding valve timing in response to the rotational torque in a first torque direction; and third means for selectively activating one of the first and second means in response to the engine driving condition for retarding and advancing phase relationship between the engine synchronous member and the camshaft.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
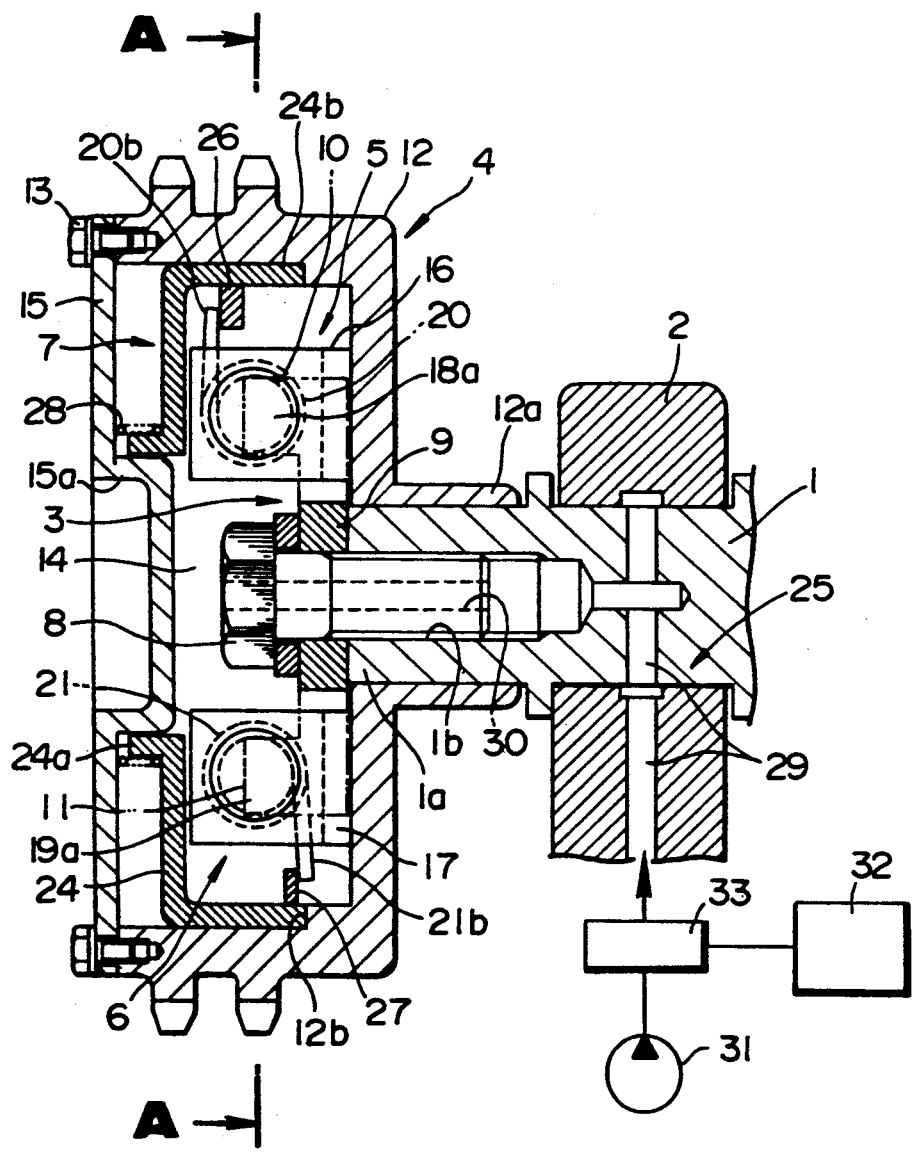
FIG. 1 is a section of the first embodiment of a valve timing control device according to the present invention.
Figure 2:
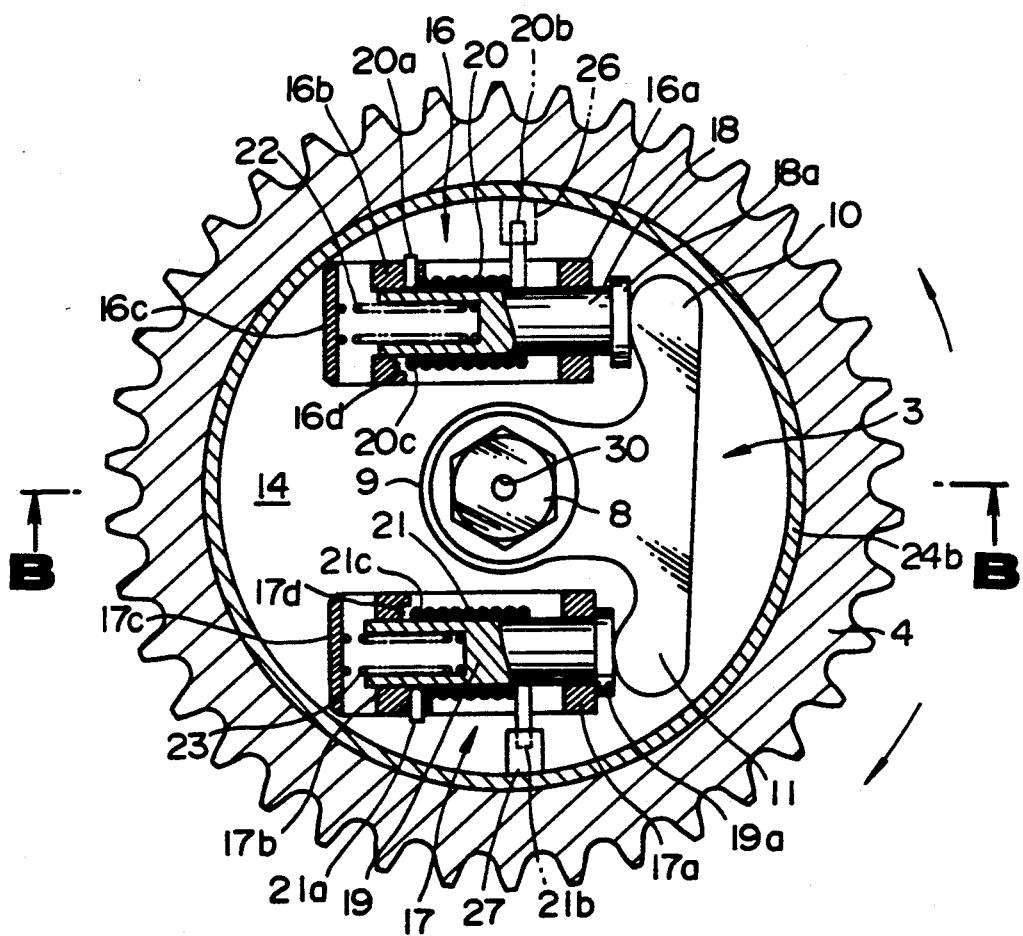
FIG. 2 is a section taken along line A—A of FIG. 1.
Figure 3:
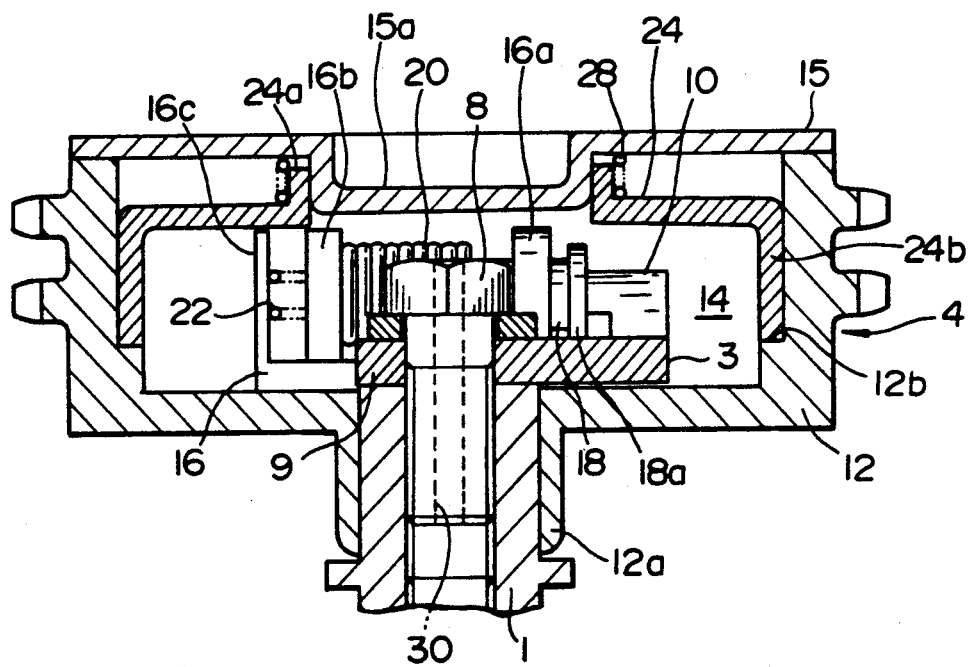
FIG. 3 is a section taken along line B—B of FIG. 2.

Referring now to the drawings, particularly to FIGS. 1 through 3, the first embodiment of a valve timing control device, according to the present invention, will be discussed herebelow in terms of application for double overhead camshaft (DOHC) type automotive internal combustion engine. A camshaft 1 as illustrated is associated with an intake valve (not shown) via a cam (not shown) for driving the intake valve in a predetermined phase relationship with respect to an engine revolution cycle. The camshaft 1 is rotatably supported on a cam bearing 2 which is provided at the upper section of an engine cylinder head. The camshaft 1 has an axially extending extension 1a with a radially extending flange 1c. A timing sprocket 4 is rotatably mounted on the extension 1a for rotation about the axis of the camshaft 1. The timing sprocket 4 is connected to an engine output shaft via a timing chain (not shown) for synchronous rotation with the engine revolution cycle. Clutch mechanisms 5 and 6 are arranged in symmetric orientation to each other. These clutch mechanisms 5 and 6 are associated with an actuator mechanism 7 which selectively engage and release the clutch mechanisms 5 and 6 for establishing interlocking between the timing sprocket 4 and the camshaft 1 at the selected phase relationship.

The extension 1a is formed with a threaded bore 1b formed along the axis of the camshaft 1. An essentially T-shaped arm 3 is pivotally mounted on the axial end of the extension 1a by means of a mounting bolt 8. The arm 3 has an essentially cylindrical pivot section 9 and arm sections 10 and 11 extending essentially in perpendicular direction to the axis of the camshaft 1. The arm sections 10 and 11 are respectively held in contact with the outer ends of pistons 17 and 18 of the clutch mechanisms 5 and 6.

The timing sprocket 4 comprises an essentially C-shaped sprocket body 12 and a cover member 15 secured on the axial end of the cylindrical section 12a of the sprocket body 12 by means of fastening bolts to define a pressure chamber 14. The cover member 15 has a central cylindrical projection 15a projecting into the pressure chamber 14.

The clutch mechanism 5 and 6 have cylinders 16 and 17 which are formed by bending plates. The cylinders 16 and 17 are oriented within the interior space of sprocket body 12 and extended substantially in directions parallel to horizontal axis. The pistons 18 and 19 are disposed within the cylinders 6 and 7 for thrusting motion there through. In order to guide the thrusting motion of the pistons 18 and 19, guide strips 16a, 16b, 17a and 17b are provided the cylinders 16 and 17 integrally. Clutch springs 19 and 20 are wound around the the pistons 18 and 19.

The pistons 18 and 19 have essentially disc shaped end pieces 18a and 19a which are rigidly fixed onto the main body of the pitons. The disc shaped end pieces 18a and 19a are mating with the arm sections 10 and 11 of the arm 3. The pistons 18 and 19 are formed with axial bores 18b and 19b, in which are disposed coil springs 22 and 23. The coil springs 22 and 23 are seated on end walls 16c and 17c of the cylinders 16 and 17. On the other hand, the guide strips 16a and 17a are oriented in the vicinity of the end pieces 18a and 19a. Therefore, the coil springs 22 and 23 biases the pistons 18 and 19 outwardly for maintaining the end pieces 18a and 19a in contact with the arm sections 10a and 11a of the arm 3. On the other hand, the guide strip 16b and 17b are oriented in the vicinity of the axial end of the piston remote from the end pieces. The guide strips 16a and 17a also serve to abut with the end pieces 18a and 19a of the pistons 18 and 19 and whereby restrict thrusting motion magnitude of the pistons.

Another oil springs 20 and 21 are wound around the outer periphery of the pistons 18 and 19. The winding directions of the coils springs 20 and 21 are the same to each other. One ends 20b and 21b of the oil springs 20 and 21 are seated on spring seat projections 26 and 27 projecting from the inner periphery of a larger diameter section 24b of a slider 24. As can be seen from FIG. 1, the projections 26 and 27 are oriented at mutually and axially offset positions to each other. The other ends 20a and 21a of the coil springs 20 and 21 are connected to the guide strips 16b and 17b. The guide strips 16b and 17b are also formed with spring seat grooves 16d and 17d for receiving the axial end section of the coil portion of the coil springs 20 and 21.

The actuator mechanism 7 includes the slider 24 disposed within the pressure chamber 14. The slider is movable in axial direction for tightening and loosening the coil springs 20 and 21. The slider 24 is responsive to the fluid pressure in the pressure chamber 14 for causing axial movement. The pressure chamber 14 is in fluid communication with a hydraulic circuit which is generally represented by the reference numeral "25".

The slider 24 has a smaller diameter flange section 24a slidingly mounted on the cylindrical projection 15a of the cover member 15 so that the axial motion of slider can be guided. On the other hand, the larger diameter section 24b of the slider 24 mates with the inner periphery if the timing sprocket 12 for sliding movement therealong. Since the axial end of the larger diameter section 24b of the slider 24 opposes the shoulder 12b formed on the inner periphery of the sprocket 12, the maximum right hand stroke of the slider 24 is limited by the shoulder 12b. A coil spring 28 is disposed between the slider 24 and the cover member 15 for constantly biasing the slider toward right in FIG. 1. Therefore, the spring force of the coil spring 28 is constantly exerted to bias spring 21 via the projection 27.

The hydraulic circuit 25 is branched from an oil main gallery (not shown) and includes an induction path 29 which is connected to the oil main gallery, and an axial path 30 defined through the fastening bolt 8. The hydraulic circuit 25 thus establishes fluid communication between a fluid pump 31 and the pressure chamber 14. An electromagnetic valve 33 is disposed in the hydraulic circuit 25 for selectively blocking establishing and blocking fluid flow through the hydraulic circuit. The electromagnetic valve 33 is connected to a control unit 32 which derives a control signal for controlling the valve position of the electromagnetic valve. In general, the control unit 32 derives the control signal on the basis of the engine driving condition, such as an engine load condition. Namely, the control unit 32 commands to maintain the phase relationship between the timing sprocket 12 and the camshaft 1 at a predetermined initial phase relationship while the engine load is lower than a predetermined engine load criterion. On the other hand, the control unit 32 is responsive to the engine load higher than the engine load criterion to advance the phase relationship between the timing sprocket 12 and the camshaft 1.

Figure 5:
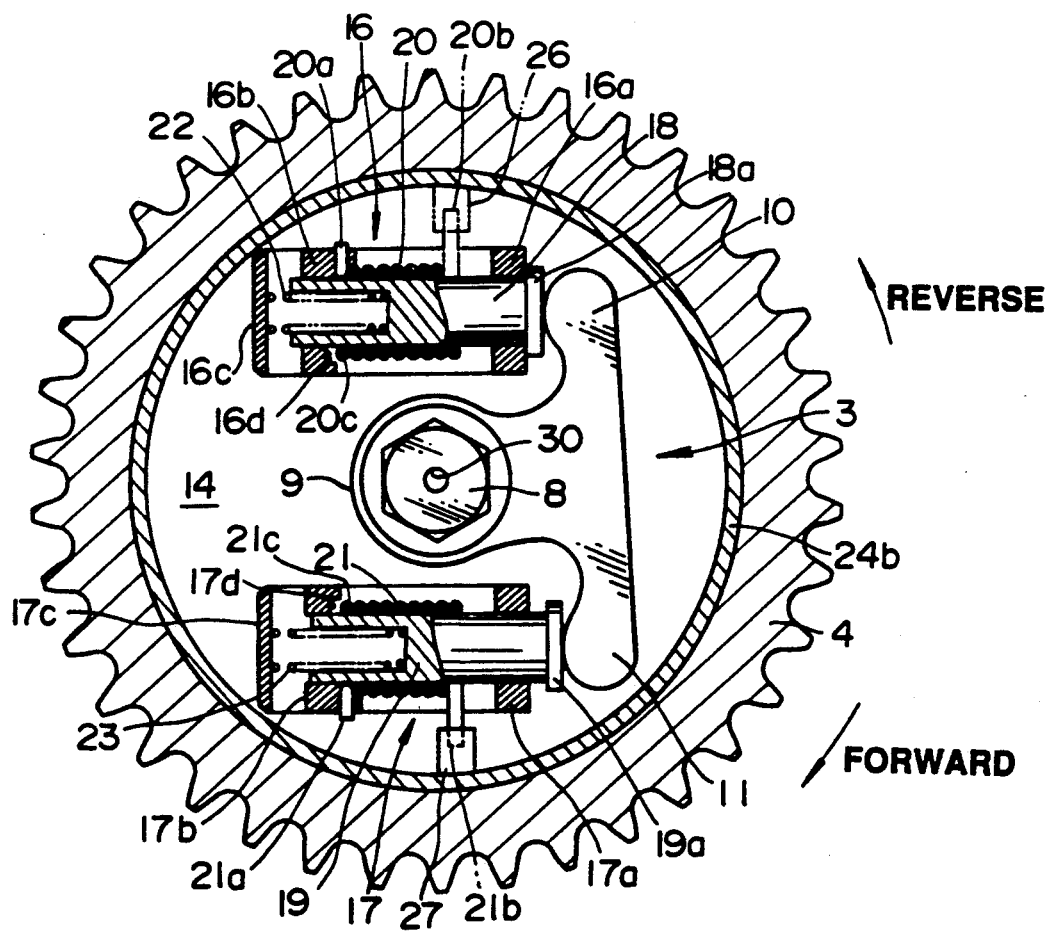
FIG. 5 is a section taken along line C—C of FIG. 4.

Namely, while the engine load is relatively low, the control unit 32 feeds low level control signal to maintain the electromagnetic valve at shut off position to block fluid flow through the hydraulic circuit 25. Therefore, the fluid pressure in the pressure chamber 14 is maintained low level. Therefore, the spring force of the coil spring 28 overcomes the fluid pressure to maintain the slider 24 at an initial position. As a result, the thrusting force of the slider acts on the clutch spring 21 to cause loosening spring force. Therefore, the piston 19 becomes free for thrusting movement. At this condition, when forward torque is applied for the camshaft 1 upon closing of the intake valve, the piston 19 is depressed to shift toward left in FIG. 2 to until the end disc 19a abut onto the mating end surface of the guide strip 17a. As a result, camshaft 1 is permitted to cause phase shift relative to the timing sprocket 12 in forward direction (clockwise direction in FIG. 2), as shown in FIG. 5.

At this time, the piston 18 receives weak tightening torque of the clutch spring 20. However, since the piston is free from the depression force of the arm 10, the piston 18 is shifted toward right in FIG. 2 to project from the cylinder 16. At this condition, when negative (or counterclockwise torque is applied to the camshaft 1, concentric load is exerted at the end 20a of the clutch spring 20 to cause increasing of the coil density to induce friction force. At the same time, the end portion 20c of the clutch coil 20 enters into the recess 16d to cause inclination of each coil loop. Therefore, each look becomes elliptic configuration to cause expansion of one diametric dimension. At this condition, tension stress as reacting force is generated for the clutch spring in winding or tightening direction. Therefore, tightening force of the clutch spring 20 for the piston 18 is increased. On the other hand, the tightening force for the piston 18 is increased according to depression force of the arm 3. Therefore, the motion in retracting direction (toward left in FIG. 2) is successfully prevented. Since the arm section 10 of the arm 3 is maintained in contact with the end disc 18a of the piston 18, pivotal movement of the arm 3 can be prevented. Therefore, valve closure timing can be maintained at retarded or initial position.

Figure 4:
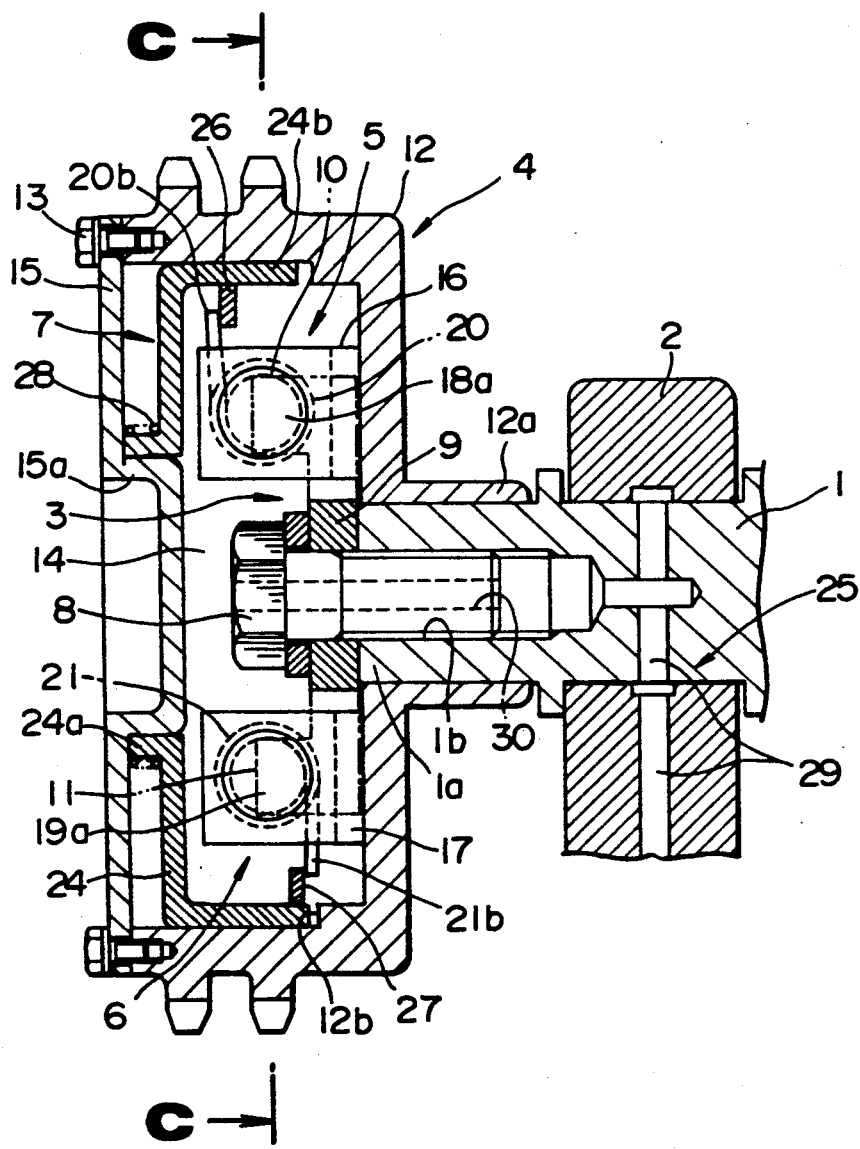
FIG. 4 is a section similar to FIG. 1 but showing the different phase position.

On the other hand, when the engine load is high, the control unit 32 feeds high level control signal to activate the electromagnetic valve 33 to open. As a result, the pressurized fluid discharged from the fluid pump 31 is fed through the hydraulic circuit 25 for increasing the fluid pressure in the pressure chamber 14. Therefore, the slider 24 is shifted toward left in FIG. 1 overcoming the spring force of the coil spring 28. As a result, the thrusting force is exerted on the end 20b of the clutch spring 20 to loosen the tightening torque thereof. As a result, the piston 18 becomes free from restriction and thus can be shifted axially, as shown in FIG. 4. At the same time, the leftward movement of the slider 24 causes releasing of the thrusting depression force for the clutch spring 21 to increase tightening torque for the piston 19.

At this condition, in response to the forward (clockwise in FIG. 2) torque exerted on the camshaft 1 upon opening of the camshaft 1, the arm section 10 of the arm 3 depresses the piston 18 toward left in FIG. 2. Therefore, the piston 18 is shifted toward left until the end disc 18a comes into contact with the mating end face of the guide strip 17a. As a result, the camshaft 1 becomes free to rotate in negative direction. On the other hand, similarly to the foregoing, the piston 19 receives weak tightening torque of the clutch spring 21. However, since the piston 18 is free from the depression force of the arm section 11 of the arm 3, the piston 19 is shifted toward right in FIG. 2 to project from the cylinder 17. At this condition, when forward (or clockwise torque is applied to the camshaft 1, concentric load is exerted at the end 21a of the clutch spring 21 to cause increasing of the coil density to induce friction force. At the same time, the end portion 21c of the clutch coil 21 enters into the recess 17d to cause inclination of each coil loop. Therefore, each loop becomes elliptic configuration to cause expansion of one diametric dimension. At this condition, tension stress as reacting force is generated for the clutch spring 21 in winding or tightening direction. Therefore, tightening force of the clutch spring 21 for the piston 19 is increased. On the other hand, the tightening force for the piston 19 is increased according to depression force of the arm 3. Therefore, the motion in advancing direction (toward left in FIG. 2) is successfully prevented. Since the arm section 10 of the arm 3 is maintained in contact with the end disc 19a of the piston 19, pivotal movement of the arm 3 can be prevented. Therefore, valve closure timing can be advanced from the initial position.

When the engine load drops from high load to low load, the pressurized fluid in the hydraulic circuit 25 is drained to lower the fluid pressure in the pressure chamber 14, therefore the phase relationship between the timing sprocket 12 and the camshaft 1 can be returned to the initial position.

FIGS. 6 to 9 show the second embodiment of the valve timing control device according to the present invention. In this embodiment, the timing sprocket 12 in the former embodiment is replaced with a timing pulley 104 which is associated with a coughed belt so as to be driven by the output of the engine in synchronism with the engine revolution. Also, the shown embodiment is features in rotating mechanism 150.

In the detailed construction of the second embodiment of the valve timing control device will be discussed herebelow with reference to FIGS. 6 to 9. Similarly to the former embodiment, an arm 103 is mounted on the axial end 101a of a camshaft 1 by means of a mounting bolt 110. The arm 102 has an essentially cylindrical pivot section 103a inserted into a recess formed at the axial end 101a of the camshaft. The arm 103 also has arm section 103b which extends in a direction perpendicular to the axis of the camshaft 101. The arm section 103b is formed with a pair of through openings 111a and 111b in the vicinity of both ends thereof. Depression pins 112 and 113 are provided through the through openings 111a and 111b by press fitting. The depression pins 112 and 113 have round top heads 112a and 113a. Respective of the round top heads 112a and 113a mate with essentially disc shaped ends 120a and 121a of pistons 120 and 121.

The timing pulley 104 is formed of a plurality of notching on the outer periphery on essentially cylindrical pulley body 114. An essentially disc shaped cover member 117 is mounted on the axial end of the pulley body 114 and fixed thereonto by means of fastening bolts 115. The cover member 117 defines a pressure chamber 116 together with the pulley body 114. The pulley body 114 has an axially extending cylindrical end 114a rotatably mounted on the axial end portion 101a of the camshaft 101. On the other hand, the cover member 117 is formed with a central extension 117a. The central extension 117a is formed with a center boss through which an adjuster screw 117 is engaged. The adjuster screw 117 is extended into an atmospheric chamber 132 which is exposed into the atmosphere and thus maintained at the atmospheric pressure. The adjuster screw 117 thus extended into the atmospheric chamber 132 thus serves for defining the shifting stroke of a slider 127 toward left in FIG. 6.

Figure 6:
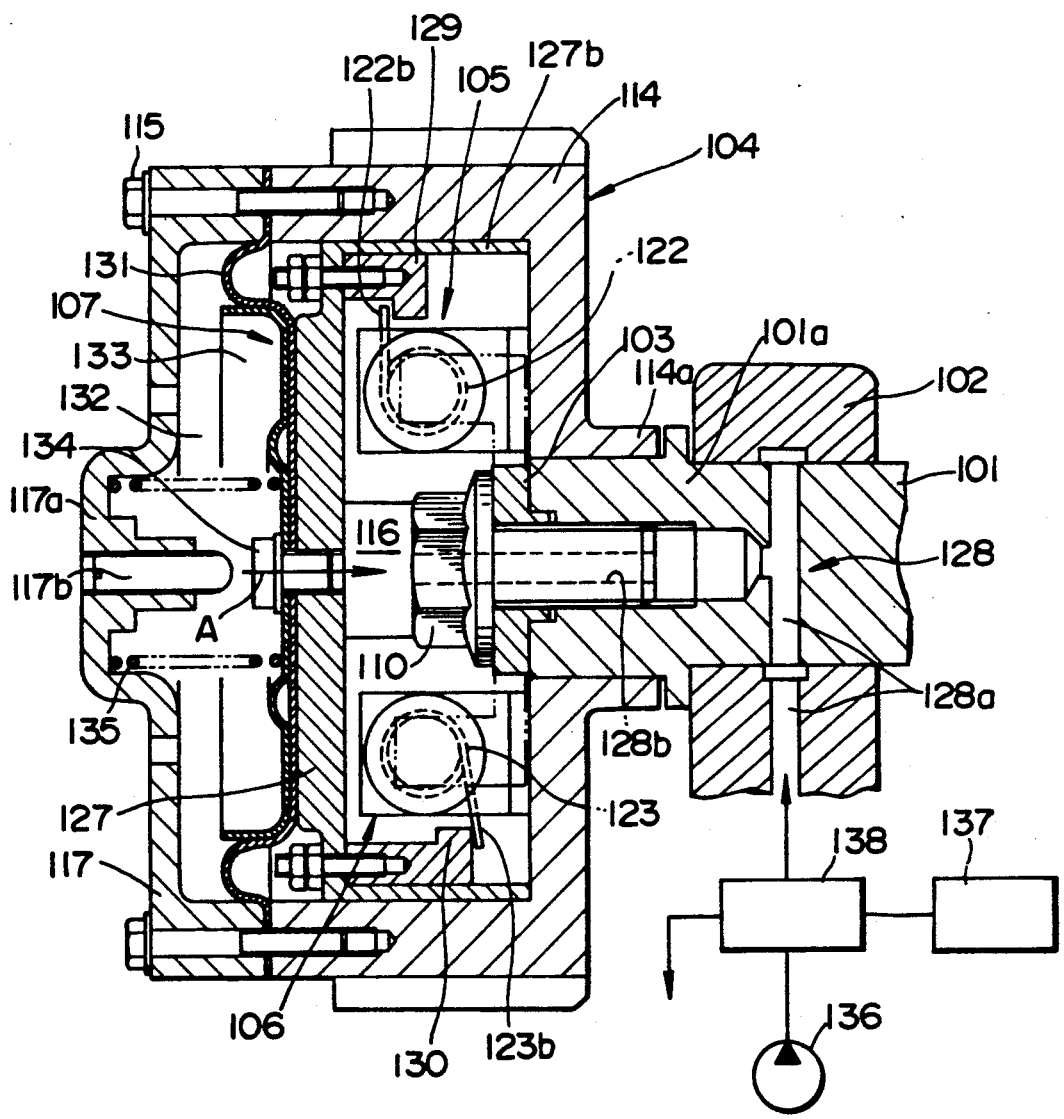
FIG. 6 is a section of the second embodiment of a valve timing control device according to the present invention.
Figure 7:
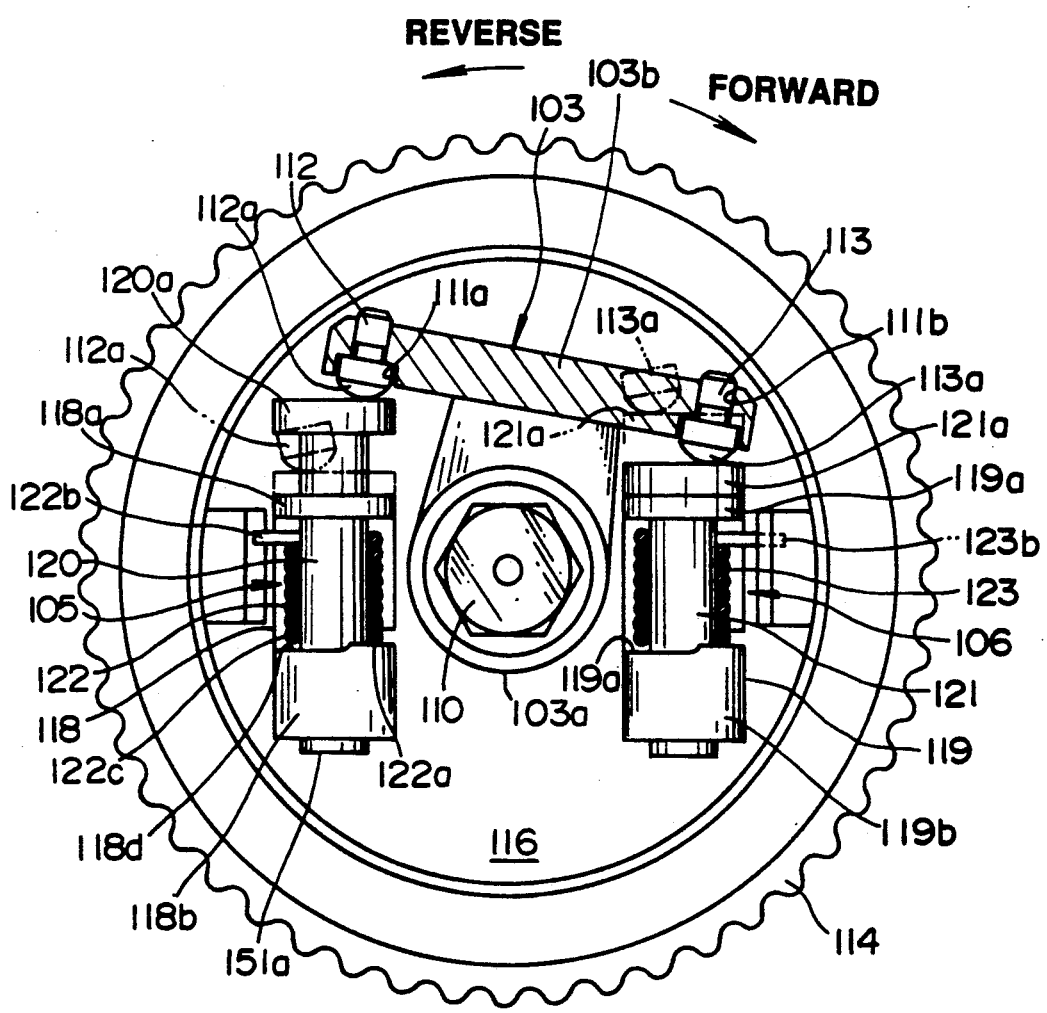
FIG. 7 is a cross section of the second embodiment of the valve timing control device as viewed along the arrow A in FIG. 6.
Figure 8:
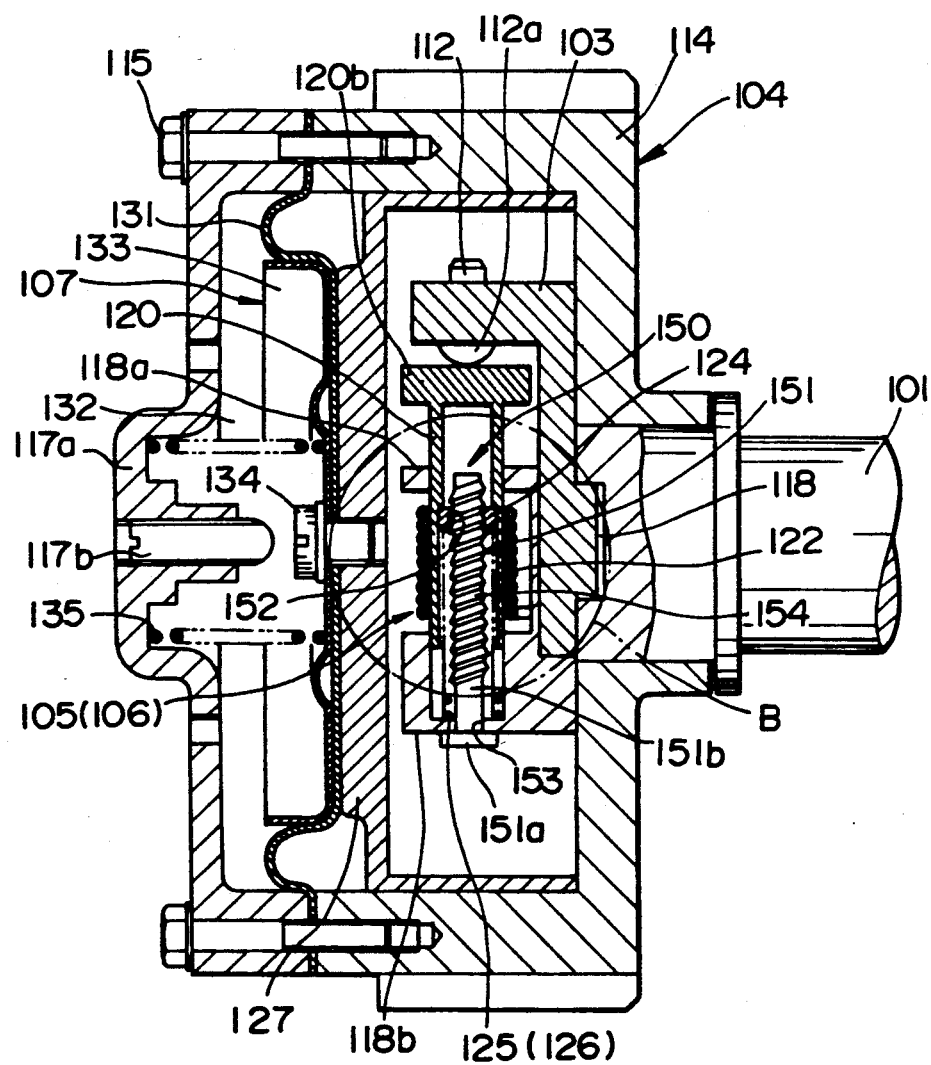
FIG. 8 is a section of the second embodiment of the valve timing control device as section at a position along the axis of an actuator.
Figure 9:
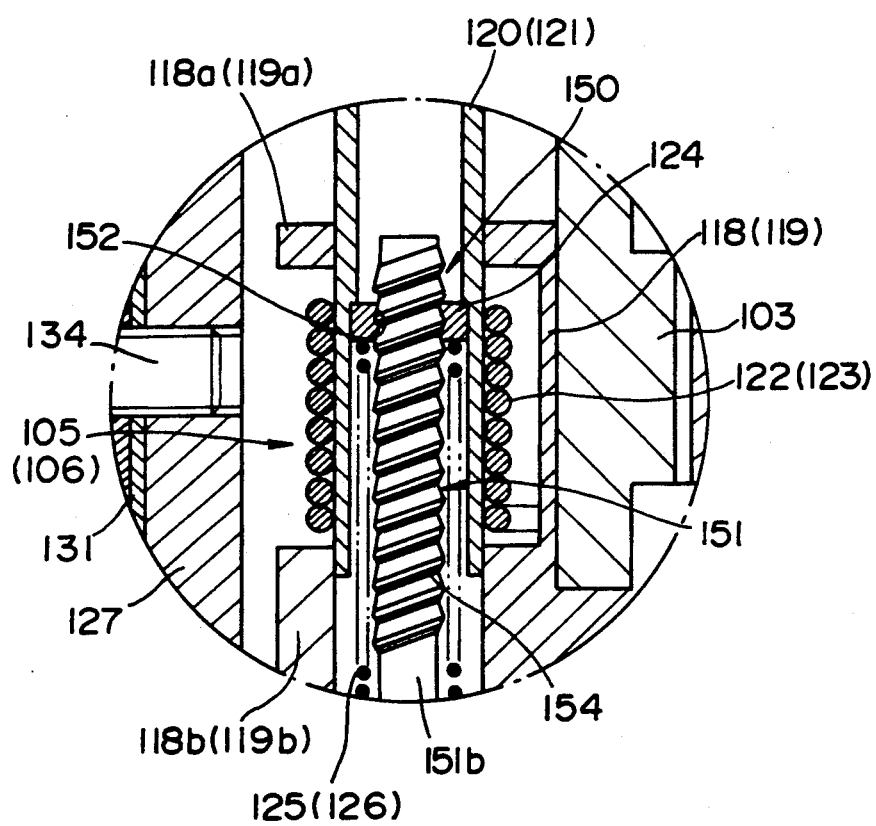
FIG. 9 is an enlarged section of the major portion of the actuator in FIG. 8.

Clutch mechanisms 105 and 106 generally comprises the same construction to that discussed in FIG. 6. Namely, as shown in FIGS. 7 to 9. The clutch mechanism 105 and 106 include cylinders 118 and 119 and the pistons 120 and 121 thrustingly disposed within the cylinders 118 and 119. Clutch springs 122 and 123 are wound around the outer periphery of the piston 120 and 121. The pistons 120 and 121 carries the end discs 120a and 121a. The pistons 120 and 121 have cylindrical main body in which is pressingly disposed compression rings 124. Compression springs 125 and 126 are disposed within the interior space of the cylindrical main body of the pistons 120 and 121. One ends of the compression springs 125 and 126 are seated on the compression rings 124. The other ends of the compression springs 125 and 126 are seated on the cylindrical sections 118b and 119b of the cylinders 118 and 119. The guides 118a and 119a serve for restricting thrusting motion stroke of the pistons 120 and 121 in retracting directions by abutting onto the end discs 12a and 121a. Furthermore, the pistons 120 and 121 are driven to rotate by rotating mechanism 150.

Switching mechanism 107 comprise the slider 127 which is thrustingly movable within the pressure chamber 116 for tightening and loosening the clutch springs 122 and 123. The pressure chamber 116 is connected to a hydraulic circuit 128 for adjusting fluid pressure therein for shifting of the slider 127.

The slider 127 has a radial section 127a and a cylindrical section 127b. On the surface of the radial section 127a of the slider 127, a diaphragm 131 is fitted. The circumferential edge of the diaphragm 131 is sandwiched between the axial ends of the timing pulley body 114 and the circumferentially extending section of the cover member 117 which are rigidly secured by beams of the fastening bolts 115. Essentially dish or pan shaped support plate 133 is also fitted on the diaphragm 131 at the side opposite to that mating with the radial section of the slider 127. The support plate 133 and the diaphragm 131 are fixed onto the radial portion of the slider 127 by means of a fastening bolt 134. A coil spring 135 is disposed in the atmospheric chamber 132 for exerting spring force onto the assembly of the slider 127, the diaphragm 131 and the supporting member 133.

Similarly to the foregoing second embodiment, phase relationship between the timing pulley and the camshaft can be adjusted between the initial position and advanced position by controlling the valve position of an electromagnetic valve 138 by a control signal issued by a control unit 137 for establishing and blocking fluid flow from a fluid pump 136 through the hydraulic circuit 128.

FIG. 9 shows the detailed construction of the rotating mechanism 150. As can be seen from FIGS. 8 and 9, a threaded members 151 is disposed within the interior space of the cylindrical piston body. The threaded members 151 engage thread 152 formed on the inner periphery of the supporting rings 124. The threaded member 151 has a disc shaped head 151a and a shaft section 151b extending through a through opening 153 formed through the end wall of the cylindrical portion 118b and 119b of the cylinder 118 and 119. The threaded member 151 also has a male thread 154 engaging with the female thread 152 of the supporting member. The male thread 154 and the female thread 152 has relatively wide pitch. The threading directions are so selected as to cause rotation of the piston 120 and 121 for tightening the clutch springs 122 and 123 when the piston is shifted in retarding direction.

In the shown embodiment, tightening torque of the clutch spring can be increased more quickly than that in the first embodiment, response characteristics in adjusting valve timing can be enhanced.

Figure 10:
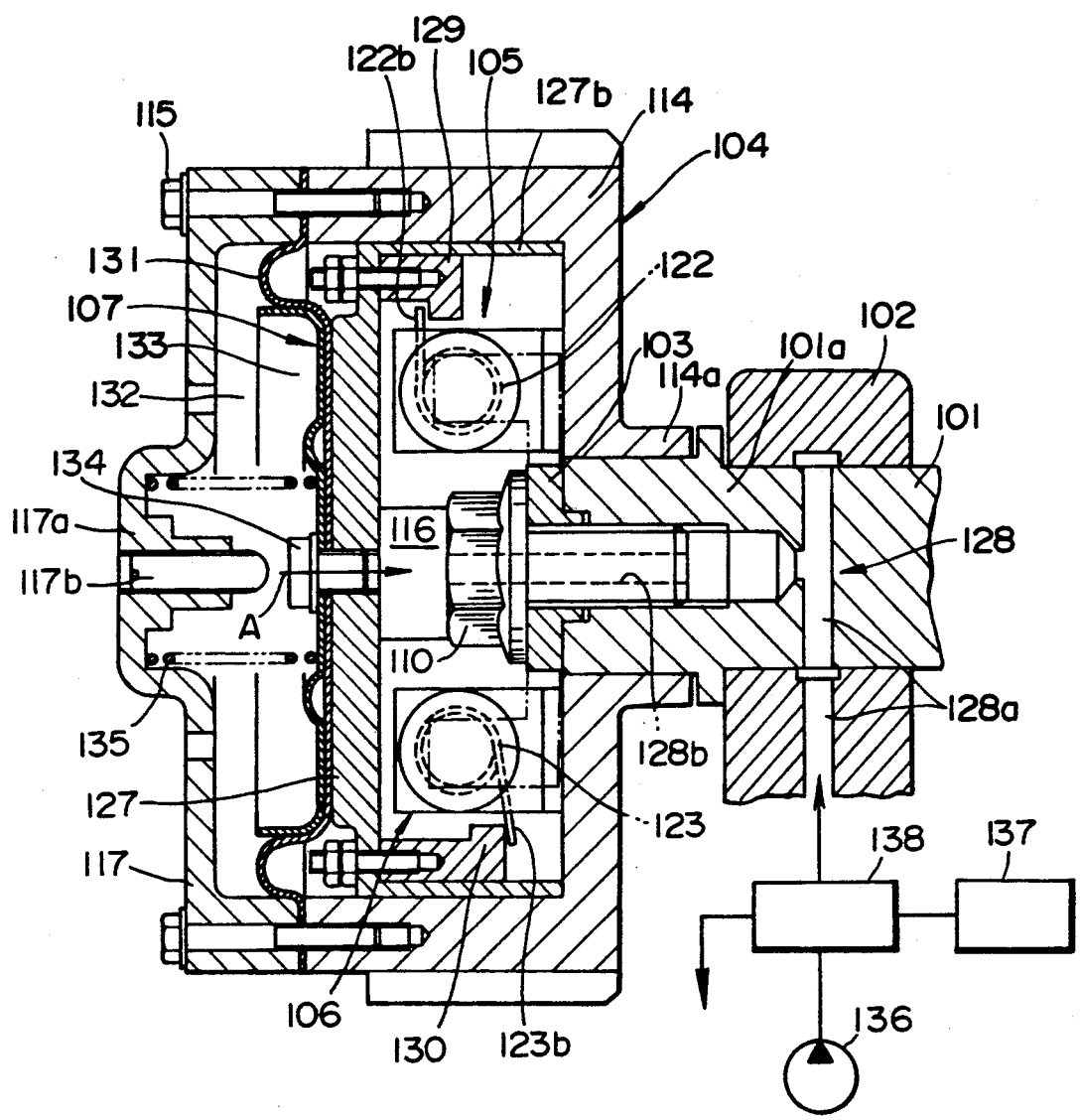
FIG. 10 is a section of the third embodiment of a valve timing control device according to the invention.
Figure 11:
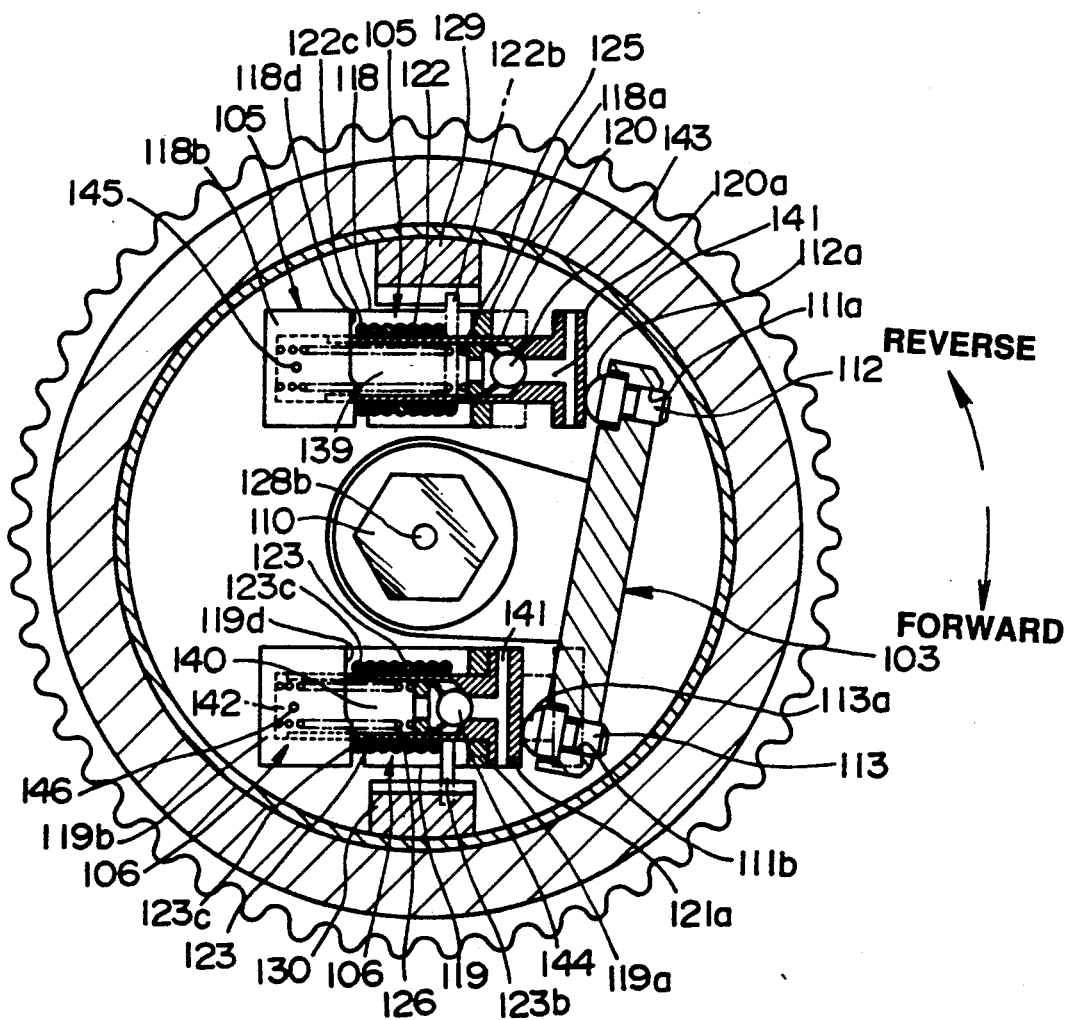
FIG. 11 is a section taken along line D—D in FIG. 10.
Figure 12:
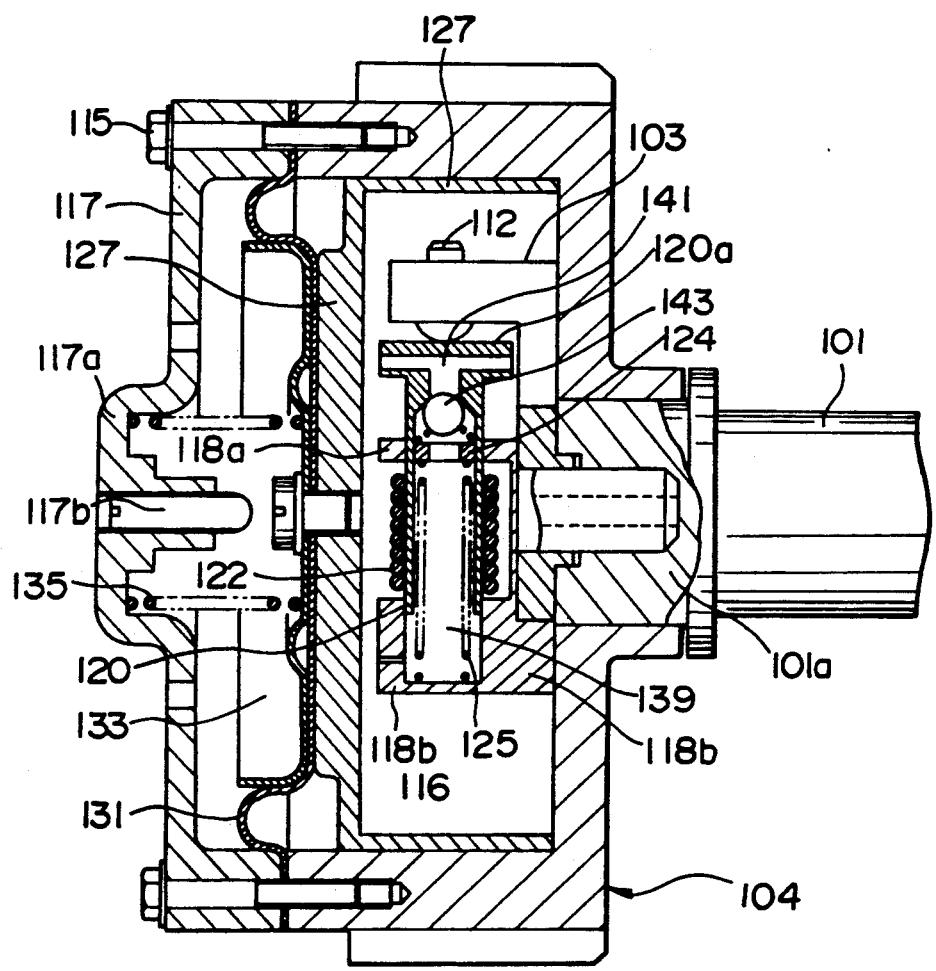
FIG. 12 is a section showing the actuator employed in the third embodiment of the valve timing control device.

FIGS. 10 to 12 show the third embodiment of the valve timing control device according to the present invention. The shown embodiment is close to the embodiment of FIGS. 6 to 9. Therefore, the component having the same construction to the second embodiment will be represented by the same reference numerals to the former embodiment.

The shown embodiment features in construction of the pistons 120 and 121. As can be seen from FIG. 12, the cylindrical piston body of the pistons 120 and 121 are cooperative with the cylindrical portions 118a and 119a of the cylinders 118 and 119 for defining fluid chamber 139 which is in communication with the pressure chamber 116 via a flow restriction orifice 145. The fluid chamber 139 and 140, is, in turn communicated with the pressure chamber 116 via a fluid path 141. A check valve 143 and 144 is provided in the fluid path 141 for permitting fluid flow from the pressure chamber 116 to the fluid chamber 116 and blocking the fluid flow in the opposite direction.

In the shown construction, the fluid in the fluid chamber 139 and 140 is active for damping thrusting energy of the pistons 118 and 119 for preventing noise from being created by collision of end discs 120a and 121a of the piston onto the guide 118a and 119a.

Figure 13:
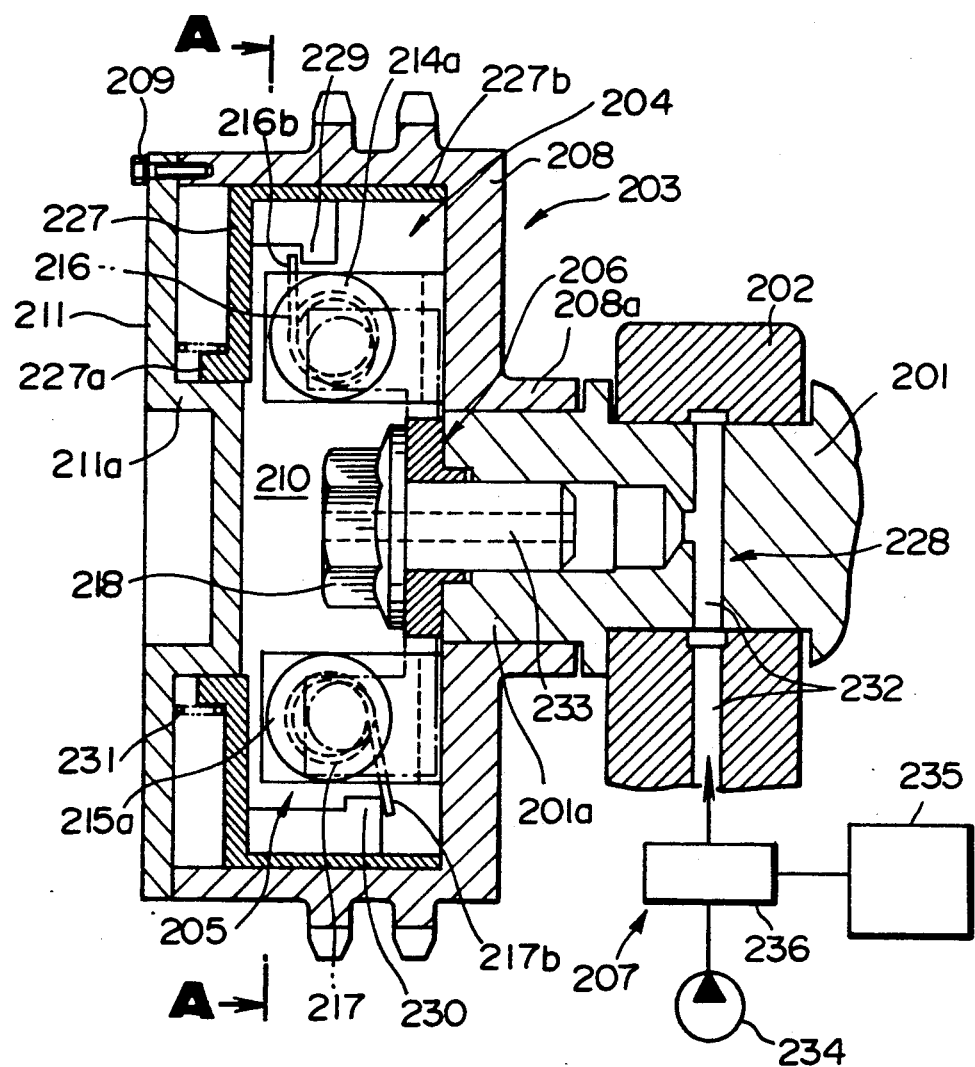
FIG. 13 is a section of the fourth embodiment of a valve timing control device according to the invention.
Figure 14:
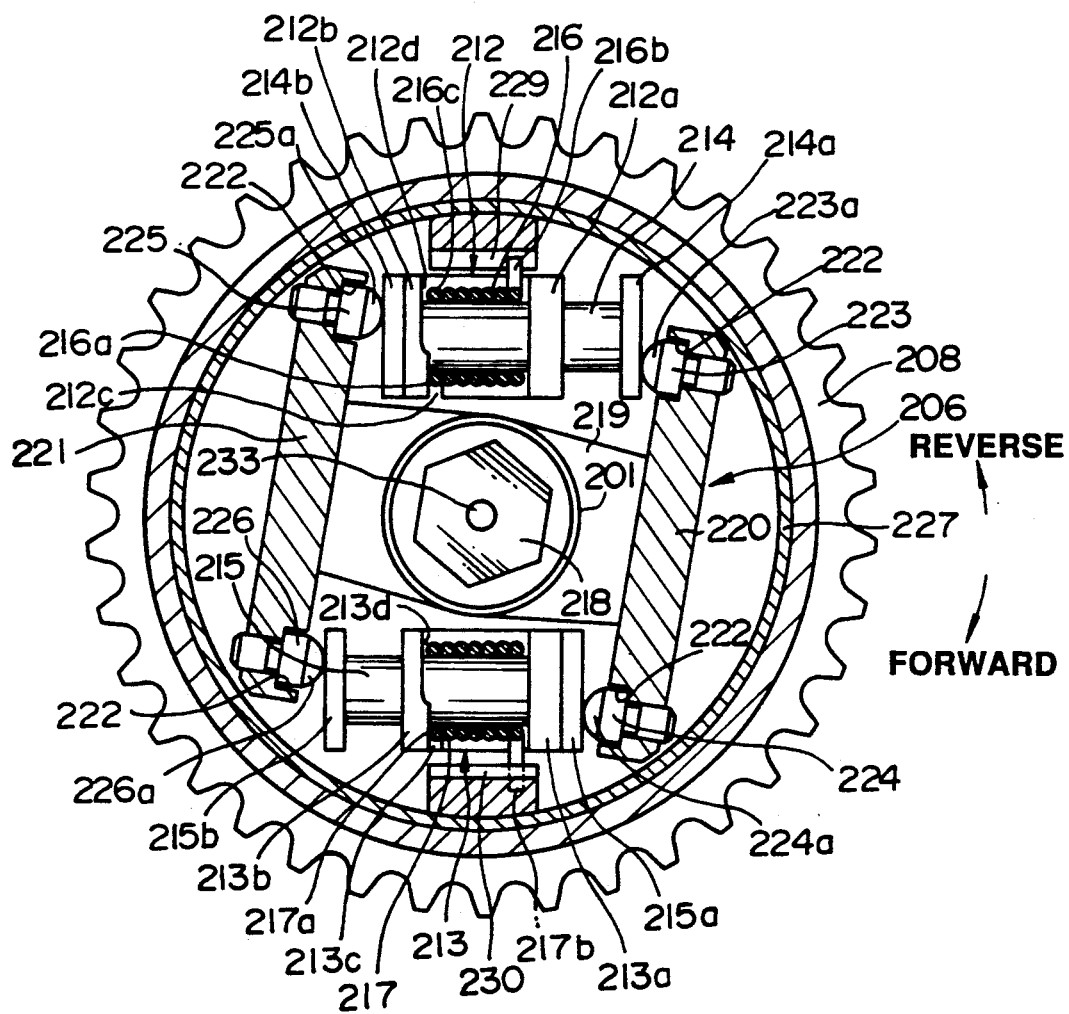
FIG. 14 is a section taken along line E—E in FIG. 13.
Figure 15:
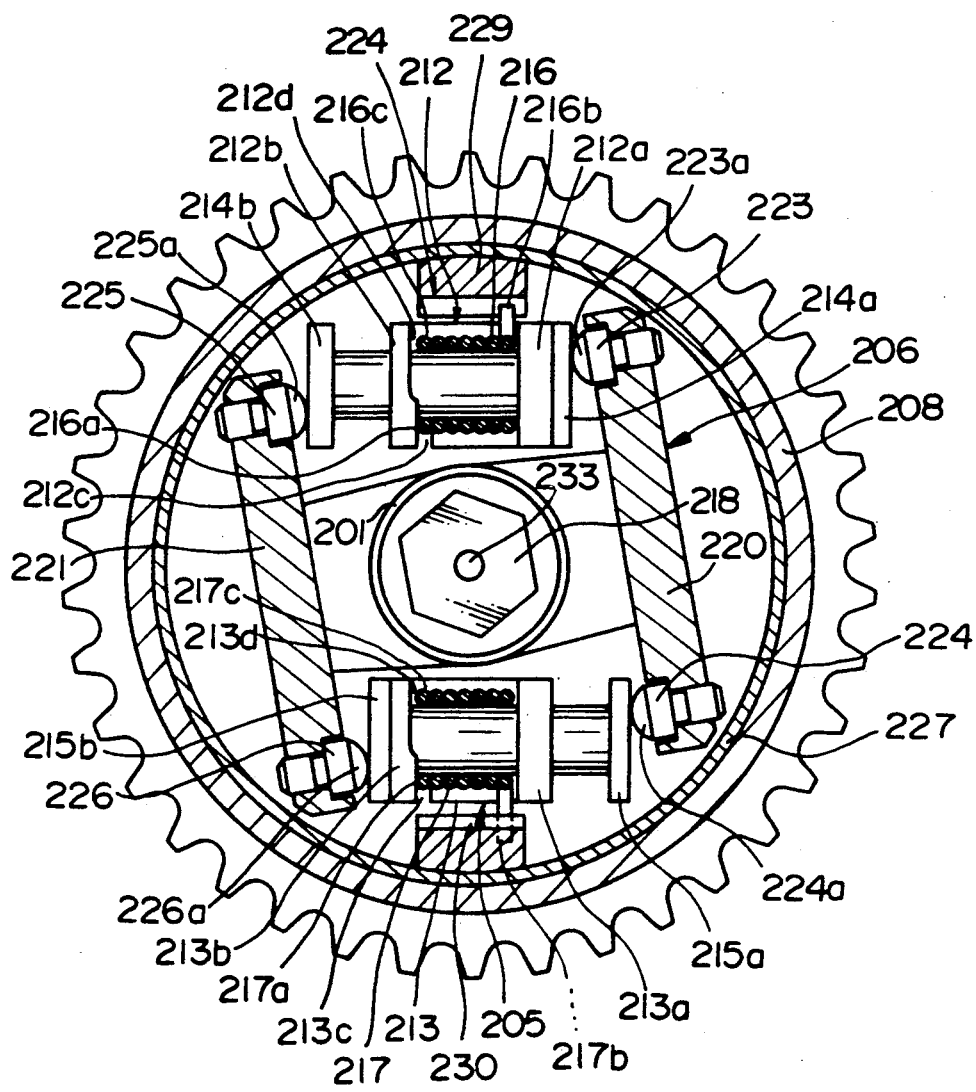
FIG. 15 is a section showing the actuator employed in the fourth embodiment of the valve timing control device.

FIGS. 13 to 15 show the fourth embodiment of the valve timing control device according to the present invention. The shown embodiment is applied for chain type cam drive arrangement. Therefore, as similar to the first embodiment, a timing sprocket 104' is employed in place of the timing pulley.

A camshaft 201 as illustrated is associated with an intake valve (not shown) via a cam (not shown) for driving the intake valve in a predetermined phase relationship with respect to an engine revolution cycle. The camshaft 201 is rotatably supported on a cam bearing 202 which is provided at the upper section of an engine cylinder head. The camshaft 201 has an axially extending extension 201a with a radially extending flange. A timing sprocket 208 is rotatably mounted on the extension 201a for rotation about the axis of the camshaft 201. The timing sprocket 204 is connected to an engine output shaft via a timing chain (not shown) for synchronous rotation with the engine revolution cycle. Clutch mechanisms 204 and 205 are arranged in symmetric orientation to each other. These clutch mechanisms 204 and 205 are associated with an actuator mechanism 207 which selectively engage and release the clutch mechanisms 204 and 205 for establishing interlocking between the timing sprocket 208 and the camshaft 201 at the selected phase relationship.

The extension 201a is formed with a threaded bore 201b formed along the axis of the camshaft 201. An arm 206 is pivotally mounted on the axial end of the extension 1a by means of a mounting bolt 218. The arm 206 has an essentially cylindrical pivot section 219 and arm sections 220 and 221 extending essentially in perpendicular direction to the axis of the camshaft 201. The arm sections 220 and 221 are formed with respective pair of through openings 222 in the vicinity of both ends thereof. Depression pins 223, 224, 225 and 226 are provided through the through openings 222 by press fitting. The depression pins 223, 224, 225 and 226 have round top heads 223a, 224a, 225a and 226a. Respective of the round top heads 223a, 224a, 225a and 226a mate with essentially disc shaped ends 214a, 214b and 215a, 215b of the pistons 214 and 215. The round top heads 223a, 224a, 225a and 226a of the depression pins 223, 224, 225 and 226 carried by the arm sections 220 and 221 are respectively held in contact with the outer ends of pistons 214 and 215 of the clutch mechanisms 204 and 205.

The timing sprocket 204 comprises an essentially C-shaped sprocket body 208 and a cover member 211 secured on the axial end of the cylindrical section 208a of the sprocket body 208 by means of fastening bolts to define a pressure chamber 209. The cover member 211 has a central cylindrical projection 211a projecting into the pressure chamber 210.

Clutch mechanisms 204 and 205 generally comprises the same construction to that discussed in FIG. 6. Namely, as shown in FIGS. 13 to 15, the clutch mechanism 204 and 205 include cylinders 212 and 213 and the pistons 214 and 215 thrustingly disposed within the cylinders 212 and 213. Clutch springs 216 and 217 are wound around the outer periphery of the piston 214 and 215. One ends 216a and 217a of the clutch springs 216 and 217 are engaging to recesses 212c and 213c of the guides 212 and 213. The other ends 216b and 217b of the clutch springs 216 and 217 are engages with projection blocks 229 and 230 in the same manner as that in the former embodiments. The pistons 214 and 215 carries the end discs 214a, 215a and 214b, 215b.

The slider 227 has a smaller diameter flange section 227a slidingly mounted on the cylindrical projection 211a of the cover member 211 so that the axial motion of slider can be guided. On the other hand, the larger diameter section 227b of the slider 227 mates with the inner periphery if the timing sprocket 208 for sliding movement therealong. Since the axial end of the larger diameter section 227b of the slider 227 opposes the radial section of the timing sprocket 208, the maximum right hand stroke of the slider 227 is limited by the axial end of the slider and the radial portion of the timing sprocket. A coil spring 231 is disposed between the slider 227 and the cover member 211 for constantly biasing the slider toward right in FIG. 13. Therefore, the spring force of the coil spring 231 is constantly exerted to bias spring 21 via the projection 230.

As will be seen herefrom, since the arm sections 220 and 221 pivot in opposite direction to each other, motion of the piston can be assured for establishing interlocking of the timing sprocket and the camshaft at the selected phase relationship to each other. Furthermore, since the arm sections 220 and 221 are constantly biased for maintaining the rounded tops 223a, 224a, 225a and 226a of the depression pins 223, 224, 225 and 226 in contact with the associated disc shaped ends 214a, 215a, 214b and 215b. Therefore, noise or implusive noise which can be created by collision of the round headed tops with the associated disc-shaped end can be successfully prevented.

While the present invention has been discussed in terms of the preferred embodiment of the invention, the invention can be embodied in various ways. Therefore, the invention should be understood to include all possible embodiments and modifications which can be implemented without departing from the principle of the invention.

What is claimed is:

1. A valve timing control device for an internal combustion engine, comprising:
   an engine synchronous rotary member driven by an engine output in synchronism with engine revolution;
   a camshaft;
   first mechanical winding clutch means disposed between said engine synchronous rotary member and said camshaft and active while an engine load is lower than a predetermined engine load criterion, for causing relative angular displacement between said engine synchronous rotary member and said camshaft synchronous rotary member in a first displacement direction for retarding valve timing and interlocking said camshaft and said engine synchronous rotary member for preventing relative angular displacement in a second displacement direction which is opposite from said first direction, for advancing valve timing;
   second mechanical winding clutch means disposed between said engine synchronous rotary member and said camshaft and active while the engine load is higher than or equal to said predetermined engine load criterion, for causing relative angular displacement between said engine synchronous rotary member and said camshaft synchronous rotary member in said displacement direction for advancing valve timing and interlocking said camshaft and said engine synchronous rotary member for preventing relative angular displacement in said first displacement direction for retarding valve timing; and
   third hydraulic means for selectively actuating one of said first and second mechanical winding clutch means in response to the engine driving condition for retarding and advancing phase relationship between said engine synchronous member and said camshaft.

2. A valve timing control device as set forth in claim 1, including a pivotal member fixed to said camshaft for rotation therewith, and said clutch mechanism comprises a thrusting member movable between a projected position and a retracted position for pivoting said pivotal member at said projecting position to cause said interlocking, a biasing means cooperating with said thrusting member and normally biasing said thrusting member toward the projecting direction, and the winding clutch associated with said third means so as to be switched to modes between an inactive state in which free rotation is permitted so as not to exert the interlocking force for said thrusting member and thus permitting free motion of the associated thrusting member, and an active state in which free rotation is restricted to cause locking engagement with said thrusting member and thus restricting motion of said thrusting member.

3. A valve timing control device as set forth in claim 2, wherein said third means includes first and second members respectively coupled with winding clutches of said first and second means for switching modes thereof in such a manner than when said winding clutch of said first means is placed in the active state, said winding clutch in said second means is placed in the inactive state, and when said first means is placed in the inactive state, said winding clutch is placed in the active state.

4. A valve timing control device as set forth in claim 3, wherein said third means comprises a carrier member carrying said first and second members so that said first and second members engage with and disengage from the ends of the associated winding clutches for switching said modes of said winding clutches between said active state and said inactive state.

5. A valve timing control device for an internal combustion engine, comprising:
   an engine synchronous rotary member driven by an engine output in synchronism with engine revolution;
   a camshaft;
   first mechanical clutch means disposed between said engine synchronous rotary member and said camshaft for causing relative angular displacement between said engine synchronous rotary member and said camshaft synchronous rotary member in a first displacement direction for retarding valve timing in response to a rotational torque in a first torque direction transmitted from said camshaft and interlocking said camshaft and said engine synchronous rotary member for preventing relative angular displacement in a second displacement direction which is opposite from said first direction, for advancing valve timing in response to the rotational torque in a second torque direction opposite to said first torque direction transmitted from said camshaft said first mechanical clutch means including a wound clutch coil having a tip end cooperatively kept in contact with a cam member provided on the inner periphery of said engine synchronous rotary member, which winding clutch coil being operative for restricting relative angular displacement between said engine synchronous rotary member and said camshaft synchronous rotary member in said second displacement direction and permitting relative displacement in said first displacement direction;
   second mechanical clutch means disposed between said engine synchronous rotary member and said camshaft for causing relative angular displacement between said engine synchronous rotary member and said camshaft synchronous rotary member in said displacement direction for advancing valve timing in response to a rotational torque in a second torque direction transmitted from said camshaft and interlocking said camshaft and said engine synchronous rotary member for preventing relative angular displacement in said first displacement direction for retarding valve timing in response to the rotational torque in a first torque direction, said second mechanical clutch means including a wound clutch coil having a tip end cooperatively kept in contact with a cam member provided on the inner periphery of said engine synchronous rotary member in a position substantially in symmetry to said cam member of said first mechanical clutch means with respect to the axis of said camshaft, which winding clutch coil being operative for restricting relative angular displacement between said engine synchronous rotary member and said camshaft synchronous rotary member in said first displacement direction and permitting relative displacement in said second displacement direction; and third means for selectively activating one of said first and second means in response to the engine driving condition, in such a manner that when said first mechanical clutch means is placed in active state said second mechanical clutch means is held in inactive state and when said first mechanical clutch means is held in inactive state said second mechanical clutch means is placed in active state, for retarding and advancing phase relationship between said engine synchronous member and said camshaft.

6. A valve timing control device for an internal combustion engine, comprising:

an engine synchronous rotary member driven by an engine output in synchronism with engine revolution;

a camshaft;

first means disposed between said engine synchronous rotary member and said camshaft for causing relative angular displacement between said engine synchronous rotary member and said camshaft synchronous rotary member in a first displacement direction for retarding valve timing and interlocking said camshaft and said engine synchronous rotary member for preventing relative angular displacement in a second displacement direction which is opposite from said first direction, for advancing valve timing;

second means disposed between said engine synchronous rotary member and said camshaft for causing relative angular displacement between said engine synchronous rotary member and said camshaft synchronous rotary member in said displacement direction for advancing valve timing and interlocking said camshaft and said engine synchronous rotary member for preventing relative angular displacement in said first displacement direction for retarding valve timing; and third means for selectively activating one of said first and second means in response to the engine driving condition for retarding and advancing phase relationship between said engine synchronous member and said camshaft, each of said first and second means including a winding clutch mechanism driven by relative torque between said engine synchronous rotary member and said camshaft for establishing interlocking for presenting the relative angular displacement in the relevant direction as activated by said third means.

* * * * *